(12) United States Patent
Ota

(10) Patent No.: US 12,596,222 B2
(45) Date of Patent: Apr. 7, 2026

(54) ILLUMINATION DEVICE AND DISPLAY DEVICE

(71) Applicant: Magnolia White Corporation, Tokyo (JP)

(72) Inventor: Takashi Ota, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 18/962,129

(22) Filed: Nov. 27, 2024

(65) Prior Publication Data

US 2025/0172739 A1 May 29, 2025

(30) Foreign Application Priority Data

Nov. 27, 2023 (JP) ................................. 2023-199860

(51) Int. Cl.
| | |
|---|---|
| *F21V 8/00* | (2006.01) |
| *G02B 27/01* | (2006.01) |
| *G02F 1/13357* | (2006.01) |

(52) U.S. Cl.
CPC ......... *G02B 6/0048* (2013.01); *G02B 6/0055* (2013.01); *G02B 6/0061* (2013.01); *G02B 6/0068* (2013.01); *G02B 6/0091* (2013.01); *G02F 1/133615* (2013.01); *G02B 27/0172* (2013.01)

(58) Field of Classification Search
CPC .......................... G02B 6/0048; G02B 6/0068; G02B 27/0172; G02F 1/133524; G02F 1/133615
See application file for complete search history.

(56) References Cited

U.S. PATENT DOCUMENTS

| | | | |
|---|---|---|---|
| 2010/0214135 A1* | 8/2010 | Bathiche | G06F 3/0202 341/23 |
| 2012/0224122 A1* | 9/2012 | Koganezawa | G02B 6/002 349/65 |
| 2016/0349444 A1* | 12/2016 | Robinson | G02B 6/0068 |
| 2021/0302744 A1* | 9/2021 | Saitoh | G02F 1/133541 |
| 2023/0128012 A1 | 4/2023 | Komura et al. | |

FOREIGN PATENT DOCUMENTS

JP 2023-063088 A 5/2023

* cited by examiner

*Primary Examiner* — Keith G. Delahoussaye
(74) *Attorney, Agent, or Firm* — XSENSUS LLP

(57) ABSTRACT

According to one embodiment, an illumination device includes a light guide including a first edge and a second edge extending in a first direction, a third edge and a fourth edge extending in a second direction, a fifth edge provided between the first edge and the third edge, a sixth edge provided between the second edge and the third edge, and the fifth edge includes a first short edge extending in the first direction and a second short edge extending in the second direction, which are arranged alternately, and the sixth edge includes a third short edge extending in the first direction and a fourth short edge extending in the second direction, which are arranged alternately.

13 Claims, 9 Drawing Sheets

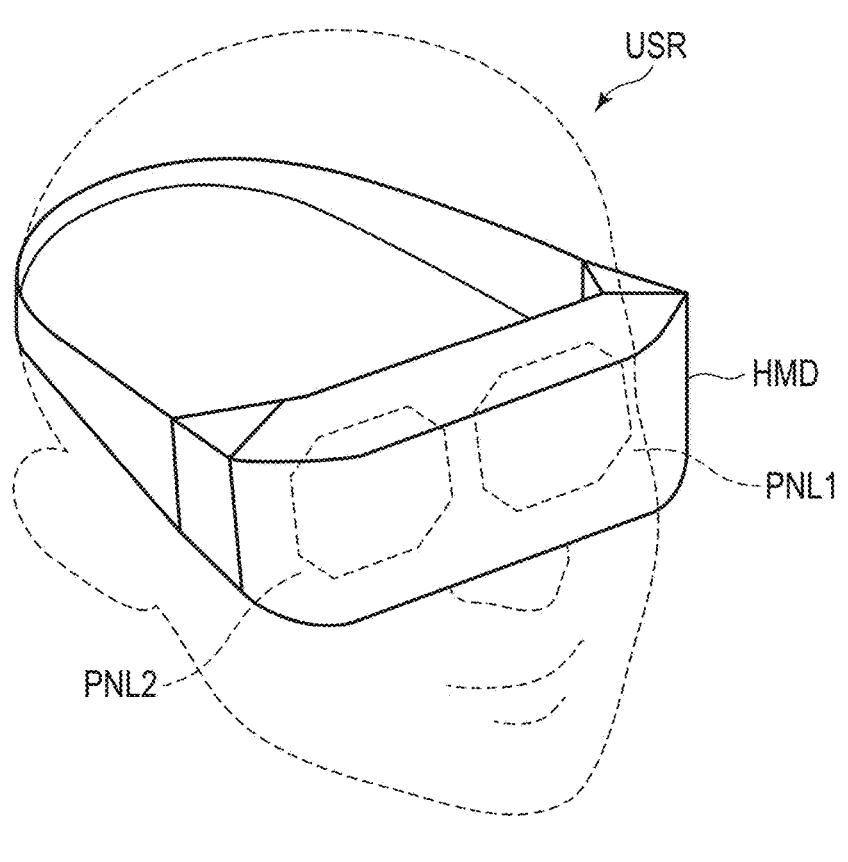
F I G. 1
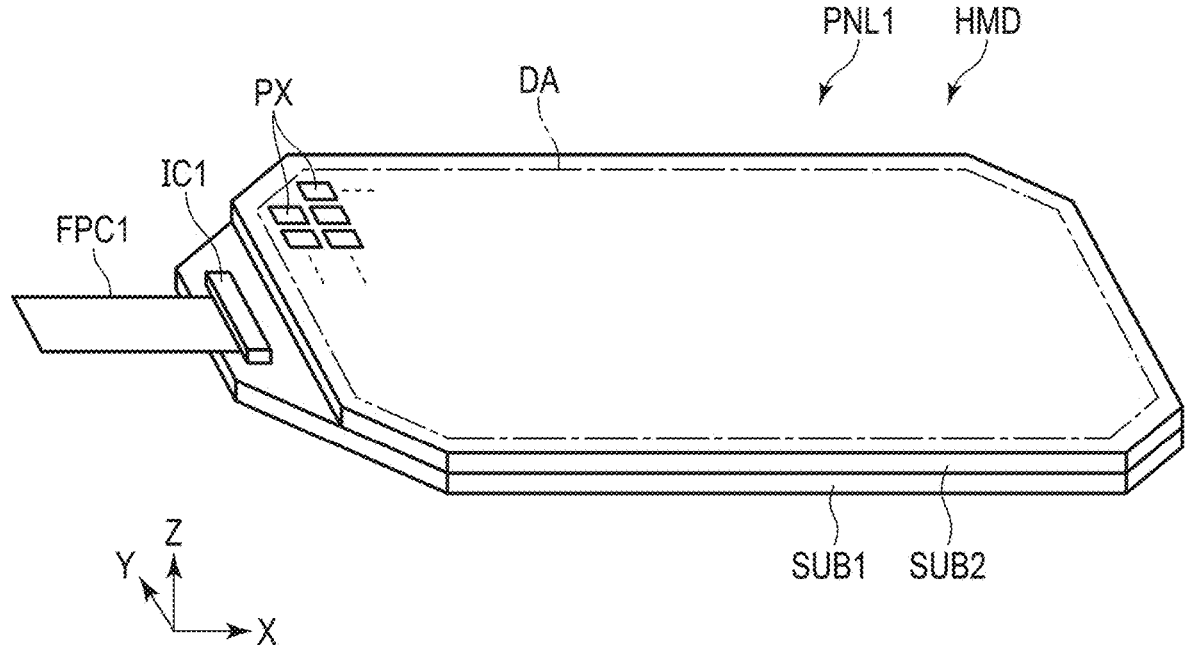
F I G. 2

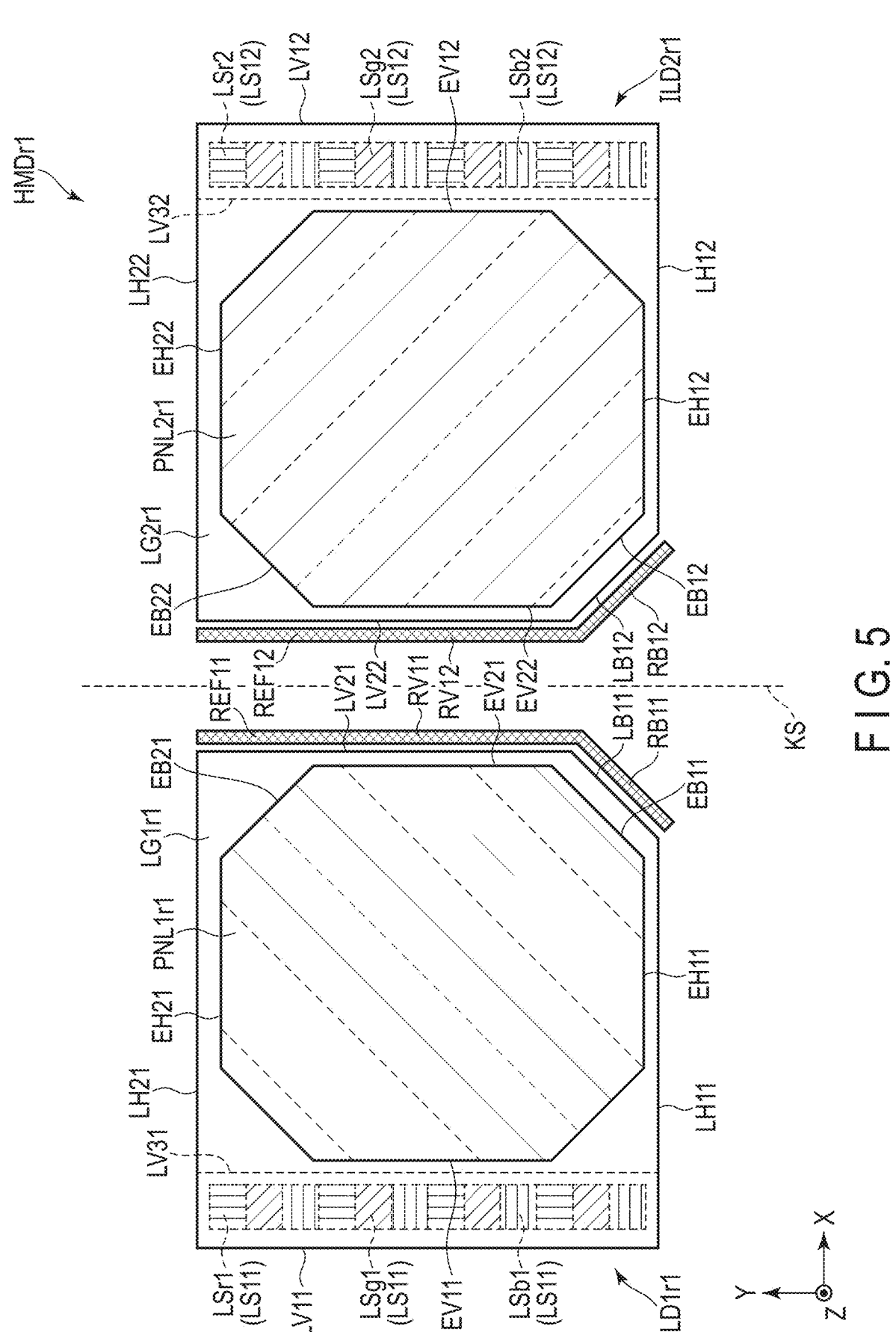
F I G. 5

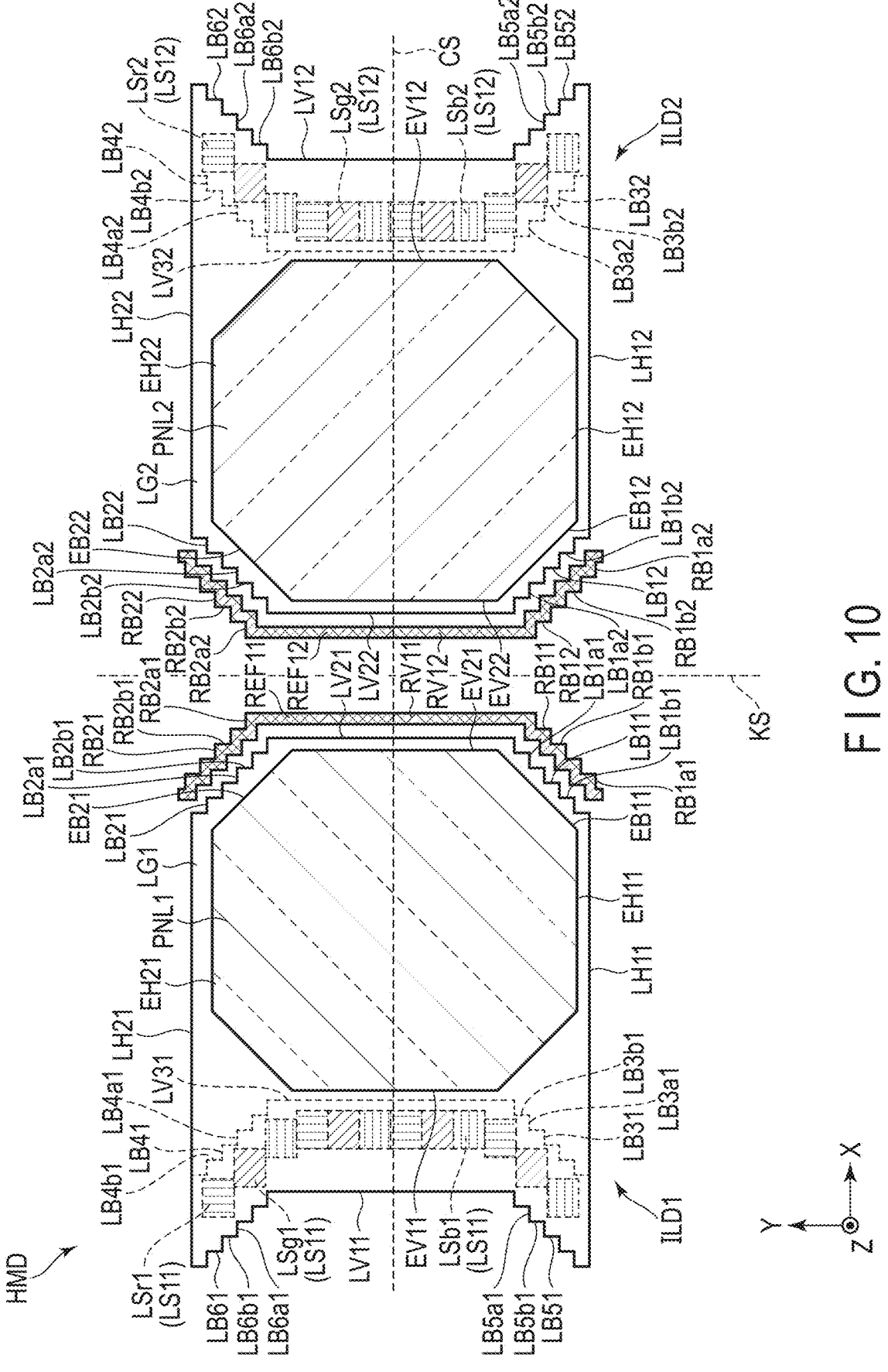
F I G. 10

ILLUMINATION DEVICE AND DISPLAY DEVICE

CROSS-REFERENCE TO RELATED APPLICATION

This application is based upon and claims the benefit of priority from Japanese Patent Application No. 2023-199860, filed Nov. 27, 2023, the entire contents of which are incorporated herein by reference.

FIELD

Embodiments described herein relate generally to a display device.

BACKGROUND

In recent years, there has been a lot of attention paid to technology that uses a display device called a head mounted display (HMD) that is worn on the user's head to provide virtual reality (VR), for example.

BRIEF DESCRIPTION OF THE DRAWINGS

FIG. 1 is a perspective view showing an example of the external appearance of a display device according to this embodiment.

FIG. 2 is a perspective view schematically showing a configuration of a display panel provided in the display device of this embodiment.

FIG. 5 is a plan view schematically showing an example of a configuration of a display device of a comparative example 1.

FIG. 10 is a cross-sectional view schematically showing an example of the configuration of the display device of the embodiment.

DETAILED DESCRIPTION

Figure 3:
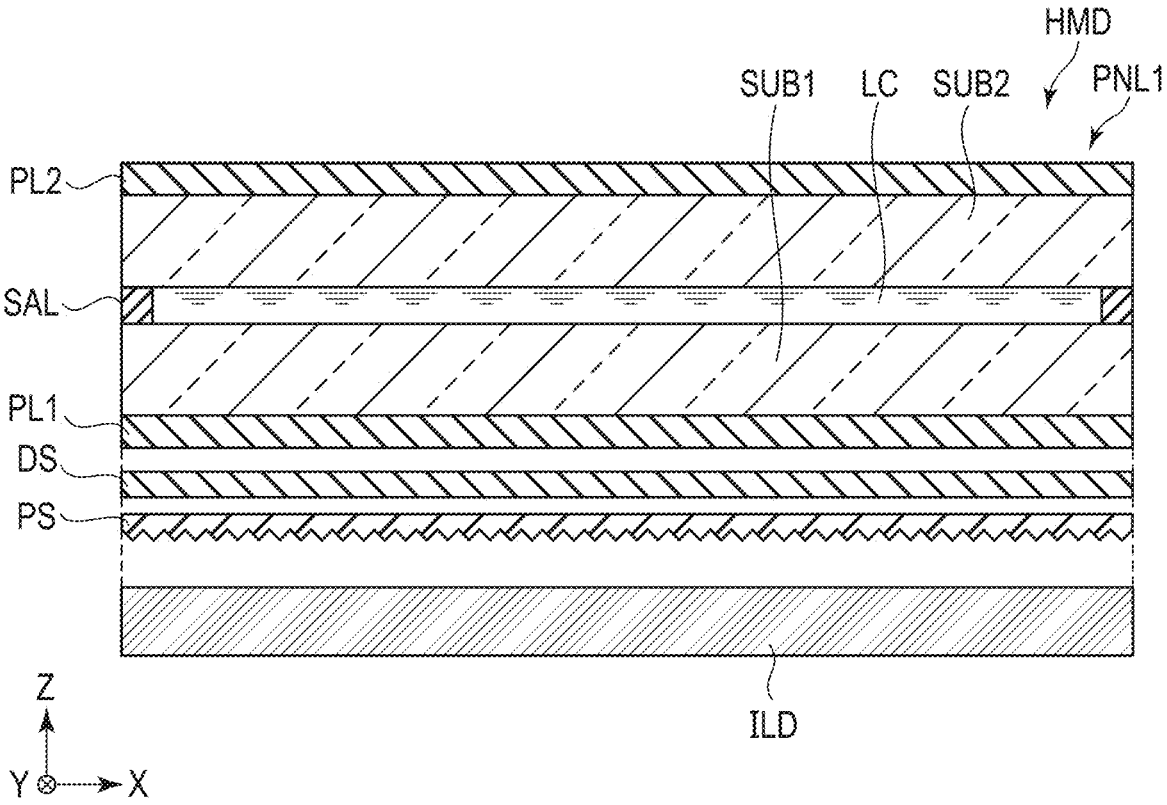
FIG. 3 is a cross-sectional view schematically showing an example of a configuration of the display device.

In general, according to one embodiment, an illumination device comprises a light guide including a first edge and a second edge extending in a first direction, a third edge and a fourth edge extending in a second direction intersecting the first direction, a fifth edge provided between the first edge and the third edge, a sixth edge provided between the second edge and the third edge;

a plurality of light source elements provided in close proximity to the fourth edge, wherein the fifth edge includes a first short edge extending in the first direction and a second short edge extending in the second direction, which are arranged alternately, and the sixth edge includes a third short edge extending in the first direction and a fourth short edge extending in the second direction, which are arranged alternately.

According to another embodiment, a display device comprises a display panel and an illumination device, the illumination device comprising:

a light guide including a first edge and a second edge extending in a first direction, a third edge and a fourth edge extending in a second direction intersecting the first direction, a fifth edge provided between the first edge and the third edge, a sixth edge provided between the second edge and the third edge;

a plurality of light source elements provided in close proximity to the fourth edge, wherein the fifth edge including a first short edge extending in the first direction and a second short edge extending in the second direction, which are arranged alternately, and the sixth edge including a third short edge extending in the first direction and a fourth short edge extending in the second direction, which are arranged alternately.

An object of this embodiment is to provide an illumination device that emits light with a uniform luminance distribution, and a display device that emits image light with a uniform luminance distribution by being illuminated by the illumination light, without increasing the manufacturing cost.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90°. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

Embodiment

FIG. 1 is a perspective view showing an example of the appearance of the display device of this embodiment. In this embodiment, the display device includes a head mounted display (HMD) that is worn on the user's head. Such a display device is used to provide, for example, virtual reality (VR) to the user wearing the display device on his/her head.

As shown in FIG. 1, the display device HMD comprises a display panel PNL1 and a display panel PNL2. Note that the display panel PNL1 and the display panel PNL2 may as well be referred to as the first display panel and the second display panel, respectively. The display panel PNL1 and the display panel PNL2 are display panels independent from each other.

The display panels PNL1 and PNL2 are respectively arranged so that they are positioned in front of the left and right eyes of a user USR when the user USR wears the display device HMD on his/her head. In this embodiment, it is assumed that the display panel PNL1 and the display panel PNL2 are liquid crystal display panels with a liquid crystal layer. In FIG. 1, the display panel PN1 is for the left eye, and the display panel PN2 is for the right eye.

FIG. 2 is a perspective view schematically showing a configuration of the display panel provided in the display device of this embodiment. Here, the configuration of the display panel PN1 will be mainly explained.

The display panel PN1 shown in FIG. 2 comprises a first substrate SUB1 and a second substrate SUB2 opposing the first substrate SUB1. The display panel PN1 also including a display area DA that displays images. Further, the display panel PN1 comprises a plurality of pixels PX arranged in a matrix in the display area DA, for example.

In addition, the display panel PN1L1 comprises a drive IC chip IC1 that drives the display panel PN1L1 and a flexible printed circuit board FPC1 that transmits control signals to the display panel PN1L1. The flexible printed circuit board FPC1 is connected to a control module (host computer) that controls the operation of the display device HMD.

In the example shown in FIG. 2, the first substrate SUB1 and the second substrate SUB2 each have long sides that run along the first direction X and short sides that run along the second direction Y. The first substrate SUB1 and the second substrate SUB2 each have an octagonal shape in plan view. This shape can also be described as a shape in which the corners of a rectangle are cut off. The shape of the display panel PNL1 in plan view is an octagonal shape. Note that the shapes of the display panel PNL1 and the display panel PNL2 are not limited to that of this case, but it suffices if they have a polygonal shape. The shape of the display panel may be any shape as long as it can prevent it from being hit by the nose of the user USR, which will be described later, that is, a shape whose corner portion close to the nose of the user USR is cut off.

Here, such a case is considered that the display panel PNL1 and the display panel PNL2 have a rectangular shape. In other words, it can be said that the display panel PNL1 and the display panel PNL2 do not have notched corner portions. In this case, the display panel PNL1 and the display panel PNL2 would hit the user's nose. Therefore, the rectangular display panels without cut-out corners are not suitable as the display panel PNL1 and the display panel PNL2 of the display device HMD.

FIG. 3 is a cross-sectional view schematically showing an example of a configuration of the display device. The display panel PNL1 further comprises a sealant SAL and a liquid crystal layer LC in addition to the first substrate SUB1 and second substrate SUB2 described above. In the display panel PNL1, the first substrate SUB1 and the second substrate SUB2 are adhered together by the sealant SAL. The liquid crystal layer LC is sealed between the sealant SAL and the first substrate SUB1 and the second substrate SUB2.

In the display device HMD, a first polarizer PL1 is attached to a lower surface of the first substrate SUB1 (that is, the surface that does not oppose the second substrate SUB2). To an upper surface of the second substrate SUB2 (the surface that does not oppose the first substrate SUB1), a second polarizer PL2 is attached. The first polarizer PL1 and the second polarizer PL2 each have polarization axes which are mutually orthogonal to each other.

The display device HMD comprises an illumination device ILD (which may as well be referred to as a backlight unit) on a rear surface side of the display panel PN1 (that is, an opposite side to the display surface). The illumination device ILD is connected to the control module. In the display device HMD, images can be displayed on the display panel PN1 by illuminating the display panel PN1 by the illumination device ILD.

The display device HMD comprises a prism sheet PS between the display panel PNL1 and the illumination device ILD. Further, the display device HMD comprises a diffusion sheet DS (diffusion layer) between the prism sheet PS and the display panel PNL1. The prism sheet PS comprises a plurality of prisms that extend parallel to the second direction Y, for example. These prisms are formed on a lower surface of the prism sheet PS (the surface opposing the illumination device ILD), for example. Note here that these prisms may as well be formed on an upper surface of the prism sheet PS (the surface opposing the display panel PNL1).

The prism sheet PS converts the light illuminated by the illumination device ILD into light that is substantially parallel to the third direction Z. Here, "light that is substantially parallel to the third direction Z" includes not only light that is strictly parallel to the third direction Z, but also light that has been converted by the prism sheet PS so that its tilt with respect to the third direction Z is sufficiently small compared to when it is illuminated by the illumination device ILD. Here, note that, from the perspective of maintaining the polarization of the light illuminated by the illumination device ILD, it is preferable that the prisms of the prism sheet PS should be formed on the lower surface. The light that has passed through the prism sheet PS is diffused by the diffusion sheet DS and is illuminated on the display panel PNL1. Even in the case where the viewing angle of the light that has passed through the prism sheet PS is narrow, this light can be diffused by the diffusion sheet DS, thereby making it possible to widen the viewing angle.

Further, the display panel PN1L1 is illustrated in connection with FIGS. 2 and 3, and note that the display panel PN1L2 has a configuration similar to that of the display panel PN1L1 illustrated in FIGS. 2 and 3.

Figure 4:
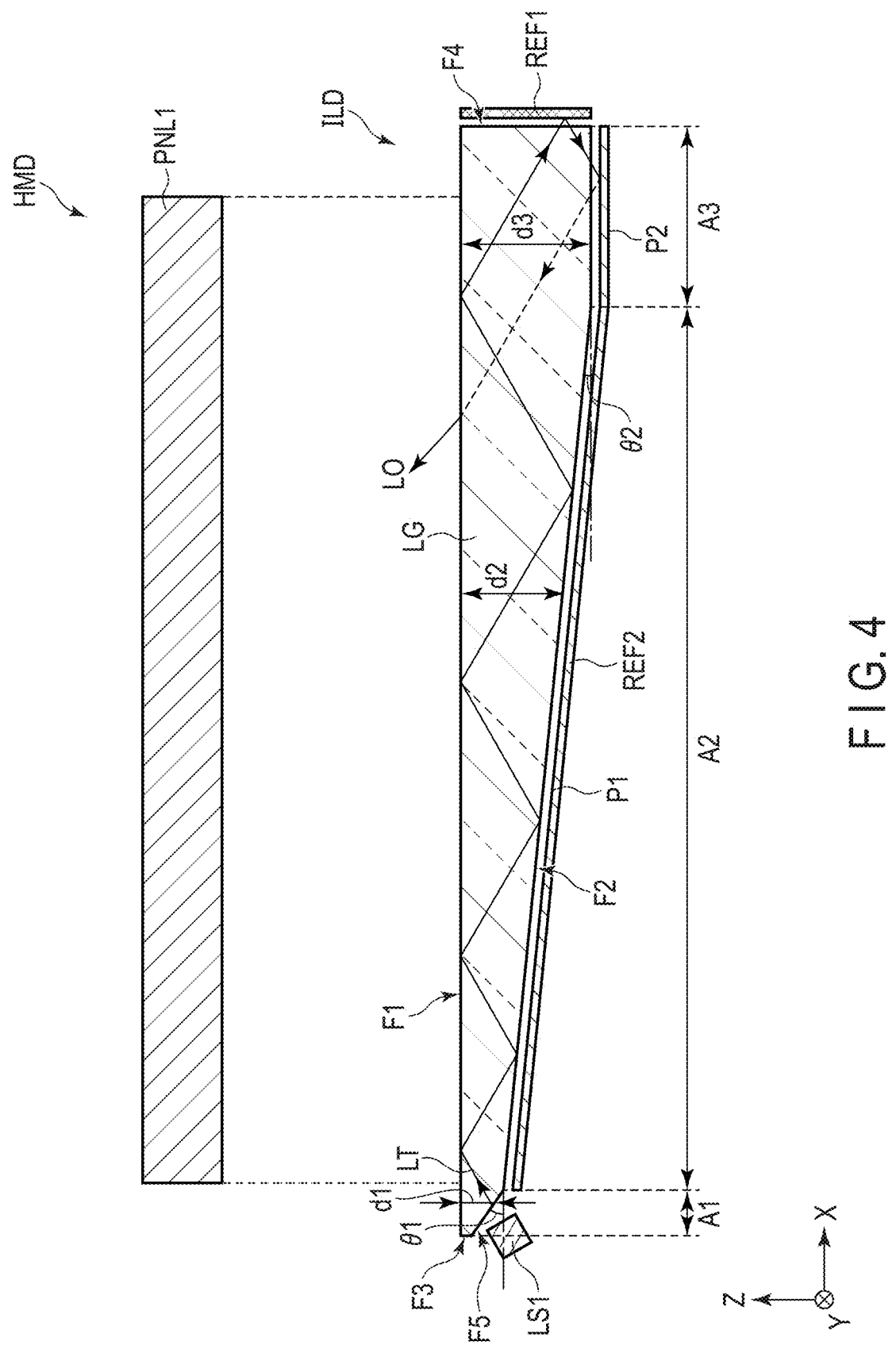
FIG. 4 is a cross-sectional view schematically showing an example of a configuration of an illumination device.

FIG. 4 is a cross-sectional view schematically showing an example of a configuration of the illumination device. A light guide LG of the illumination device ILD includes a first main surface F1 opposing the display panel PNL1, a second main surface F2 on an opposite side to the first main surface F1, a first side surface F3, and a second side surface F4 on an opposite side to the first side surface F3. A light source element LS1 is provided to oppose a slope F5 between the second main surface F2 and the first side surface F3. An optical element such as a lens may be further disposed between the light source element LS1 and the slope F5 so as to adjust the width and angle of light from the light source element LS1.

The illumination device ILD includes a reflector plate REF1 opposing the second side surface F4 and a reflector plate REF2 opposing the second main surface F2.

The second main surface F2 of the light guide LG has a first area A1, a second area A2, and a third area A3. In this embodiment, the first area A1, the second area A2, and the third area A3 are arranged along the first direction X in this order, from the side closer to the light source element LS1. The length of the area along the first direction X becomes longer in the order of the first area A1, the third area A3, and the second area A2. The reflector plate REF2 has a portion P1 corresponding to the second area A2 and a portion P2 corresponding to the third area A3.

The thickness of the light guide LG in the first area A1, that is, a distance d1, increases from the first side surface F3 towards the boundary between the first area A1 and the second area A2. The thickness of the light guide LG in the second area A2, that is, a distance d2, increases from the boundary between the first area A1 and the second area A2 towards the boundary between the second area A2 and the third area A3. In the example shown in FIG. 4, the thickness of the light guide LG in the third area A3, that is, a distance d3, is constant. The distance d3 is longer than the distance d1 or the distance d2 at a respective location of the first area A1 and the second area A2, respectively (d3>d1, d3>d2).

The first area A1 is inclined at a first angle θ1 with respect to the first main surface F1. The second area A2 is inclined at a second angle θ2 with respect to the first main surface F1. Both of the angles θ1 and θ2 are acute angles. The angle θ1 is greater than the angle θ2 (θ1>θ2). Note that in this embodiment, the angle θ1 is an acute angle, but this is not limited to that of this example. The angle θ1 may as well be 90° or an obtuse angle.

With the third area A3 thus provided, it is possible to make the luminance distribution of the light emitted from the first main surface F1 uniform. Let us consider now the case where the third area A3 is not provided, that is, where the flat area is not provided. The light entering the light guide LG from the light source element LS1 propagates inside the light guide LG and is reflected by the reflector plate REF1. In the case where the third area A3 is not provided, the light reflected by the reflector plate REF1 is reflected by the protrusion (also referred to as a groove or prism) provided below the light guide LG, and then it no longer satisfies the condition for the total reflection of the first main surface F1, and is emitted from the first main surface F1 of the light guide LG as emission light LO. In this case, when the third area A3 is not provided, the light reflected by the protrusion portion near the reflector plate REF1 travels in an opposite direction to the first direction X and then exit from the first main surface F1. In other words, no light is emitted from the vicinity of the reflector plate REF1 on the first main surface F1, and there is a risk that non-uniformity in luminance of the emission light might be created on the first main surface F1.

In contrast, in the case where the third area A3 is provided, the light reflected by the protrusion portion near the second area A2 of the third area A3 is reflected at an upper portion of the reflector plate REF1 and then emitted from the vicinity of the reflector plate REF1 on the first main surface F1. With this configuration, it is possible to suppress the non-uniformity in luminance of the emission light and improve the uniformity of the luminance distribution.

Now, the light path in which from light generated by the light source element is emitted from the illumination device ILD will be explained. The emission light output from the light source element LS1 enters the light guide LG from the slope F5. The incident light LT is repeatedly totally reflected between the first main surface F1 and the second main surface F2 of the light guide LG, and proceeds along the first direction X. The light LT that has reached the reflector plate REF1 is reflected by the reflector plate REF1. The reflected light LT proceeds in an opposite direction to the first direction X. The light LT that enters the protrusion portion (which may as well be referred to as a groove or prism) provided below the light guide LG no longer satisfies the condition for total reflection, and is emitted from the first main surface F1 of the light guide LG as emission light LO. The luminance of the light LT that has reached the reflector plate REF1 is sufficiently diffused in the second direction Y and made uniform. Therefore, the luminance of the emission light LO that exits from the first main surface F1 is uniform in the second direction Y. The emission light LO is the illumination light of the illumination device ILD.

As the light source element LS1, a laser light source (laser diode) such as a semiconductor laser that emits laser light can be used. The laser light can be diffusing light that spreads around the irradiation direction, or it can be a polarized laser light.

As mentioned above, the display device HMD of this embodiment requires two display panels PNL1 and PNL2. With the shape of these display panels, in which their corners are cut off, it is possible to prevent the display panel from hitting the user USR's nose.

However, there is a risk that the reflected light at the cut-off corners may become uneven. In order to avoid this, the notched portions are shaped into a step fashion, and thus it is possible to achieve a uniform luminance distribution of the reflected light. By achieving a uniform luminance distribution of the reflected light, it is possible to achieve a uniform luminance distribution of the illumination light emitted from the illumination device ILD and the image light obtained by modulating the illumination light on the display panel.

Note here that the shape of the display panel PNL1 of the display device HMD, the shape of the illumination device that illuminates it, and the shape of the display panel PNL2 and the shape of the illumination device ILD2 are symmetrical about the center line, but they are not identical. Therefore, when using the display panels with the shape of the notched corners or the display panels with the stepped corners described above as the display panel PNL1 and the display panels PNL2, it is necessary to prepare two display panels. The illumination devices that respectively illuminate the display panel PNL1 and the display panel PNL2 as well are symmetrical and not identical to each other. Therefore, it is also necessary to prepare separate illumination devices for the display panel PNL1 and the display panel PNL2.

FIG. 5 is a plan view schematically showing a configuration example of a display device of Comparative Example 1. As shown, a display device HMDr1 includes a display panel PNL1*r*1 and a display panel PNL2*r*1. The display panel PNL1*r*1 and the display panel PNL2*r*1 are arranged line-symmetrically with respect to a virtual line KS.

The display panel PNL1*r*1 is formed into a polygonal shape, for example, an octagonal shape. The display panel PNL1*r*1 has an edge EH11 and an edge EH21, which extend in a direction parallel to the first direction X, an edge EV11 and an edge EV21, which extend in a direction parallel to the second direction Y, and an edge EB11, which is provided on the edge EH11 and the edge EV11 and extends in a direction that forms an acute angle with the first direction X. The direction that forms an acute angle with the first direction X may as well be referred to as a fourth direction. Note, but that when the third direction Z is omitted, this direction may as well be referred to as the third direction.

Below the display panel PNL1*r*1, an illumination device ILDr1 is provided. The illumination device ILD1*r*1 includes a light guide LG1*r*1 that an edge LH11, an edge LH21, an edge LV11, and an edge LB11 that extend in directions parallel to the edge EH11, the edge EH21, the edge EV11, the edge EV21, and the edge EB11, respectively.

Along the edge EH21, the edge EV21, and the edge EB21, a reflector plate REF11 is provided. The reflector plate REF11 includes a portion RV11 and a portion RB11 that extend in directions parallel to the edge EV21 and the edge EB11, respectively.

The edge EH11, the edge EH21, the edge LH11, and the edge LH21 extend along the first direction X. The edge EV11, the edge EV21, the edge LV11, the edge LV21, and the portion RV11 extend along the second direction Y. The edge EB11, the edge LB11, and the RB11 extend in a direction that forms an acute angle with the first direction X.

A plurality of light source elements LS11 are provided adjacent to the edge EV11 of the display panel PNL1*r*1 and the edge LV31 of the light guide LG1*r*1. The plurality of light source elements LS11 include light source elements LSr1 that emit red light, light source elements LSg1 that emit green light, and light source elements LSb1 that emit blue light. Each light source element LSr1, each respective light source element LSg1, and each respective light source element LSb1 are arranged in this order along the second direction Y.

The edge LV11 and the edge EV11 shown in FIG. 5 correspond to the first side surface F3 and the second side surface F4 shown in FIG. 4, respectively. The edge LV31 of the light guide LG1, which extends in a direction parallel to the second direction Y, is located between the edge LV11 and the edge EV11. The area between the edge EV11 and the edge LV31 corresponds to the slope F5 shown in FIG. 4.

The display panel PNLR2*r*1 is formed into a polygonal shape, for example, an octagonal shape. The display panel PN L2*r*1 has an edge EH12 and an edge EH22, which extend in a direction parallel to the first direction X, an edge EV12 and an edge EV22, which extend in a direction parallel to the second direction Y, and an edge EB12, which is provided on the edge EH12 and the edge EV12 and extends in a direction at an acute angle to the first direction X. The direction that forms an acute angle with the first direction X may as well be referred to as a fifth direction. Note that when the third direction Z is omitted, this direction may as well be referred to as the fourth direction.

Below the display panel PNL2*r*1, an illumination device ILD2*r*1 is provided. The illumination device ILD2*r*1 includes a light guide LG2*r*1 that has an edge LH12, an edge LH22, an edge LV12, an edge LV22, and an edge LB12 that extend in directions parallel to the edge EH12, the edge EH22, the edge EV12, the edge EV22, and the edge EB12, respectively.

Along the edge EH22, the edge EV22, and the edge EB22, a reflector plate REF12 is provided. The reflector plate REF12 includes a portion RV12 and a portion RB12 that extend in directions parallel to the edge EV22 and the edge EB12, respectively.

The edge EH12, the edge EH22, the edge LH12, and the edge LH22 extend along the first direction X. The edge EV12, the edge EV22, the edge LV12, the edge LV22, and the portion RV12 extend along the second direction Y. The edge EB12, the edge LB12, and the edge RB12 extend in a direction that forms an acute angle with the first direction X.

A plurality of light source elements LS12 are provided adjacent to the edge EV12 of the display panel PNL2*r*1 and the edge LV32 of the light guide LG2*r*1. The plurality of light source elements LS12 include light source elements LSr2 that emit red light, light source elements LSg2 that emit green light, and light source elements LSb2 that emit blue light. Each light source element LSr2, each respective light source elements LSg2, and each respective light source elements LSb2 are arranged in this order along the second direction Y.

In the display panel PNL1*r*1, the light LT emitted from the light source element LS11 enters the inside of the light guide LG1*r*1 from the edge EV11. The light reflected at the portion RB11 makes its main light path non-parallel to the first direction X. As a result, the luminance distribution of the reflected light may not be uniform.

In the display panel PNL2*r*1, as in the case of the display panel PNL1*r*1, the light LT emitted from the light source element LS12 enters the inside of the light guide LG2*r*1 from the edge EV12. The light reflected in the portion RB12 makes it main light path non-parallel to the first direction X. For this reason, the luminance distribution of the reflected light may not be uniform.

As a solution to the above, the edge LB11 of the light guide LG1*r*1 and the portion RB11 of the reflector plate REF11, as well as the edge LB12 of the light guide LG1*r*2 and the portion RB12 of the reflector plate REF12, are each made into a step shape to achieve uniformity in the luminance distribution of the reflected light. By making the luminance distribution of the reflected light uniform, it is possible to make the luminance distribution of the illumination light emitted from each of the illumination device ILD1*r*1 and the illumination device ILD2*r*1, and the luminance distribution of the image light obtained by modulating the illumination light on the display panel uniform.

Figure 6:
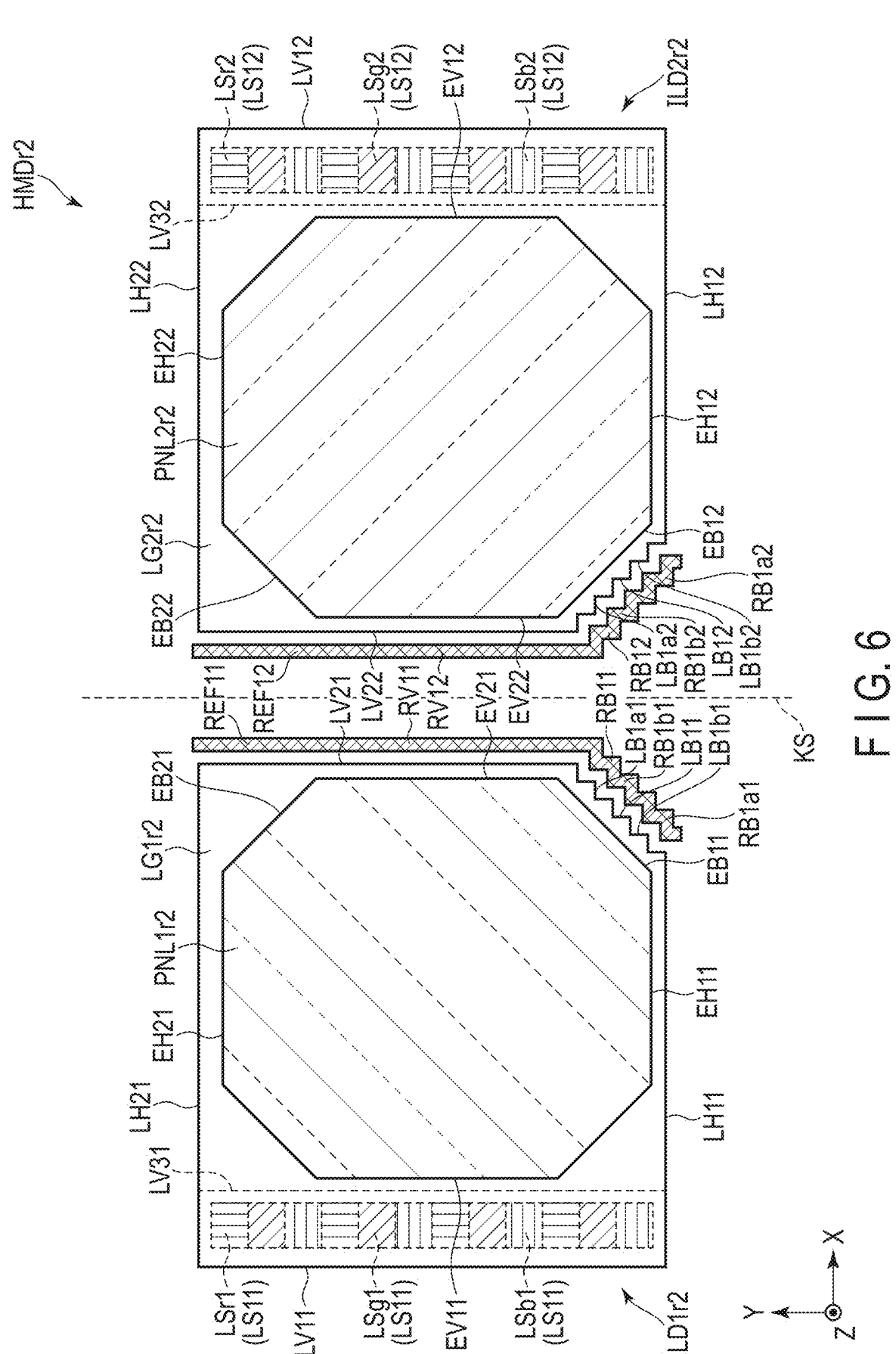
FIG. 6 is a plan view schematically showing an example of a configuration of a display device of a comparative example 2.

FIG. 6 is a plan view showing one of configuration examples of a display device of Comparative Example 2. A display device HMDr2 shown in FIG. 6 differs from the display device HMDr1 shown in FIG. 5 in that the light guide has a step-shaped edge.

The display device HMDr2 includes a display panel PNL1*r*2 and a display panel PNL2*r*2. The display panel PNL1*r*2 and the display panel PNL2*r*2 are arranged to be line-symmetrically with respect to the virtual line KS.

The illumination device ILD1*r*2 includes an edge LB11 between the edge LV21 and the edge LH11 of the light guide LG1*r*2. The edge LB11 includes an edge LB1*a*1 parallel to the first direction X and an edge LB1*b*1 parallel to the second direction Y. The edge LB1*a*1 and the edge LB1*b*1 are arranged alternately to form the step-shaped edge LB11 as a whole. In order to distinguish them from other edges, the edge LB1$a$1 and the edge LB1$b$1 may as well be referred to as short edges in some cases.

The reflector plate REF11 includes a portion RB1$a$1 and a portion RB1$b$1 arranged to oppose the edge LB1$a$1 and the edge LB1$b$1, respectively. Here, it can be said that the portion RB1$a$1 and the portion RB1$b$1 are segments arranged parallel to the first direction X and the second direction Y, respectively. The portions RB1$a$1 and the portions RB1$b$1 are arranged alternately, and as a whole, they form a step-shaped portion RB11.

The illumination device ILD2$r$2 includes an edge LB12 between the edge LV22 and the edge LH12 of the light guide LG2$r$2. The edge LB12 includes an edge LB1$a$2, which is parallel to the first direction X, and an edge LB1$b$2, which is parallel to the second direction Y. The edge LB1$a$2 and the edge LB1$b$2 are arranged alternately to form the edge LB12, which has a step-like shape as a whole. In order to distinguish them from other edges, the edge LB1$a$2 and the edge LB1$b$2 may as well be referred in some cases to short edges.

The reflector plate REF12 includes a portion RB1$a$2 and a portion RB1$b$2 arranged to oppose the edge LB1$a$2 and the edge LB1$b$2. Here, it can be said that the portion RB$a$2 and the portion RB1$b$2 are segments arranged parallel to the first direction X and the second direction Y, respectively. The portion RB1$a$2 and the portion RB1$b$2 are arranged alternately, and as a whole, they form a step-shaped portion RB12.

The shapes of the light guide LG1$r$1 and the light guide LG2$r$1 shown in FIG. 5 are mutually line-symmetric with each other, but they are not identical. The shapes of the light guide LG1$r$2 and the light guide LG2$r$2 shown in FIG. 6 are line-symmetrical with each other, but they are not the same shape. Therefore, two light guides must be prepared for one display device HMD, and there is a risk that manufacturing costs will increase.

In this embodiment, light guides which are symmetrical with respect to the vertical axis are employed, and therefore it is possible to obtain an illumination device that can be used for both the display panel PNL1 and the display panel PNL2. With this configuration, it possible to reduce the manufacturing cost of the display device HMD.

Figure 7:
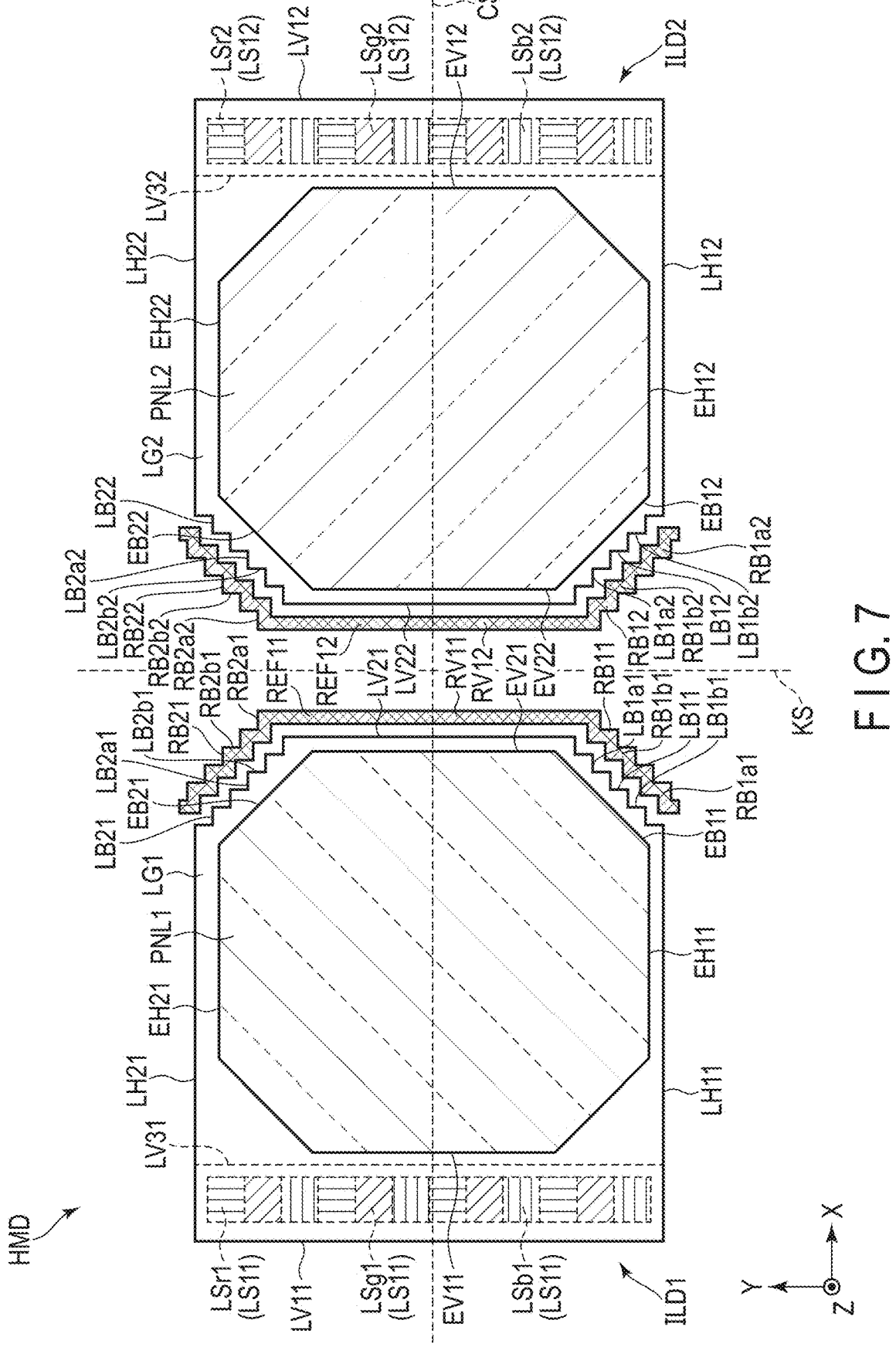
FIG. 7 is a cross-sectional view schematically showing an example of the configuration of the display device of the embodiment.

FIG. 7 is a cross-sectional view schematically showing a configuration example of the display device of the embodiment. The display device HMD shown in FIG. 7 comprises a display panel PNL1 and a display panel PNL2, and an illumination device ILD1 and an illumination device ILD2 opposing thereto, respectively.

The illumination device ILD1 shown in FIG. 7 differs from the illumination device ILD1$r$2 shown in FIG. 6 in that it has an edge LB21 between the edge LV21 and the edge LH21 of the light guide LG1. The edge LB21 includes an edge LB2$a$1 parallel to the first direction X and an edge LB2$b$1 parallel to the second direction Y. The edge LB2$a$1 and the edge LB2$b$1 are arranged alternately to form the step-shaped edge LB21 as a whole.

The light guide LG1 has a step-shaped edge LB21 shown in an upper portion of the sheet and a step-shaped edge LB11 in a lower portion of the sheet. A virtual line passing through the center of the edge LV21 of the light guide LG1 is referred to as a virtual line CS. The light guide LG1 is line-symmetrical with respect to the virtual line CS.

The illumination device ILD2 shown in FIG. 7 differs from the illumination device ILD2$r$2 shown in FIG. 6 in that it has an edge LB22 between the edge LV22 and the edge LH22 of the light guide LG2. The edge LB22 includes an edge LB2$a$2 parallel to the first direction X and an edge LB2$b$2 parallel to the second direction Y. The edge LB2$a$2 and the edge LB2$b$2 are arranged alternately to form a step-shaped edge LB22 as a whole.

The light guide LG2 has a step-shaped edge LB22 in the upper portion of the sheet and a step-shaped edge LB12 in the lower portion of the sheet. The virtual line CS described above passes through the center of the edge LV22 of the light guide LG2. The light guide LG2 is line-symmetrical with respect to the virtual line CS, as in the case of the light guide LG1.

Here, it is preferable that the lengths of the edge LB1$a$1, edge LB1$a$2, edge LB2$a$1, and edge LB2$a$2 along the first direction X should be the same as each other. It is also preferable that the lengths of the edge LB1$b$1, edge LB1$b$2, edge LB2$b$1, edge and LB2$b$2 along the second direction Y should be the same as each other. Further, it is preferable that the lengths of the edge LV21 and the edge LV22 along the second direction Y should be the same. Furthermore, it is preferable that the lengths of the edge LH11, edge LH12, edge LH21, and edge LH22 along the first direction X are the same.

The display panel PNL1 and the illumination device ILD1, and the display panel PNL2 and the illumination device ILD2 have the same shape. To be more specific, the display panel PNL1 is the same in shape as the display panel PNL2, and the illumination device ILD1 is the same in shape as the illumination device ILD2. When the display panel PNL1 and the illumination device ILD1 are rotated by 180°, they are the same as the display panel PNL2 and the illumination device ILD2, respectively. Or, it can be said that the display panel PNL2 and the illumination device ILD2 are arranged to be horizontally symmetrical to the display panel PNL1 and the illumination device ILD1, respectively.

Therefore, a set of display panels and illumination devices can be used as a combination of the display panel PNL1 and the illumination device ILD1, and a combination of the display panel PNL2 and the illumination device ILD2. Unlike Comparative Example 1 and Comparative Example 2 provided above, it is possible to reduce manufacturing costs because light guide of only one shape need to be provided.

The pitch of the step-shaped light guide LG1 and the light guide LG2, in other words, the lengths of the edge LB1$b$1, edge LB2$b$1, edge LB2$b$2, and edge LB2$b$2, are, for example, 4 mm or more and 5 mm or less, and more specifically, it is preferable to be 5 mm. Note that the pitch is not limited to this, but can be determined in accordance with the pitch of the light source elements LS11 and the light source elements LS12.

The reflector plate REF11 comprises not only the step-shaped portion RB11 but also the step-shaped portion RB21. The reflector plate REF11 comprises a portion RB2$a$1 and a portion RB2$b$1, which are arranged to oppose the edge LB2$a$1 and the edge LB2$b$1, respectively. It can be said that the portion RB2$a$1 and the portion RB2$b$1 are segments that are arranged parallel to the first direction X and the second direction Y, respectively. A portion RB2$a$1 and a portion RB2$b$1 are arranged alternately, and as a whole, they form a step-shaped part RB21.

The reflector plate REF12 has a step-shaped portion RB21 and a step-shaped portion RB22. The reflector plate REF12 has a portion RB1$a$2 and a portion RB1$b$2 arranged oppose the edge LB1$a$2 and the edge LB1$b$2, respectively. It can be said that the portion RB1$a$2 and the portion and RB1$b$2 are segments that are arranged parallel to the first direction X and the second direction Y, respectively. The portion RB1$a$2 and the portion RB1$b$2 are arranged alternately, and as a whole, they form a step-shaped part RB12.

On the reflector plate REF12, a portion RB2a2 and a portion RB2b2 are arranged to oppose the edge LB2a2 and the edge LB2b2. It can be said that the portion RB2a2 and the portion RB2b2 are segments that are arranged parallel to the first direction X and the second direction Y, respectively. The portion RB2a2 and the portion RB2b2 are arranged alternately, and as a whole, they form a step-shaped part RB22.

Figure 8:
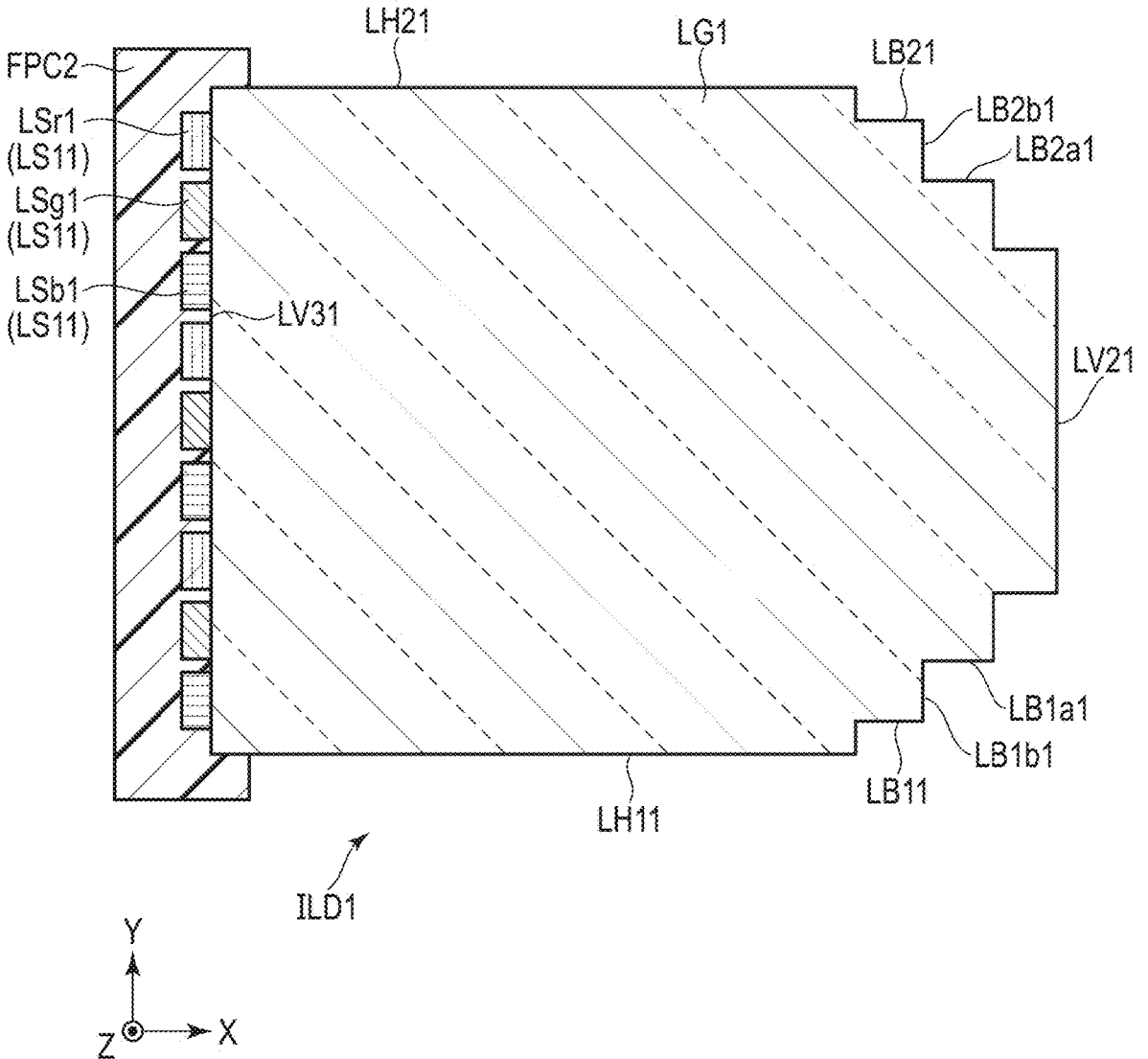
FIG. 8 is a plan view schematically showing a configuration of a light guide LG1.

FIG. 8 is a plan view schematically showing a configuration of the light guide LG1. FIG. 8 shows, in addition to the configuration of the illumination device ILD1 shown in FIG. 7, a flexible printed circuit board FPC2 connected to the light source element LS11. The flexible printed circuit board FPC2 is provided in close proximity to the edge LV31 of the light guide LG1.

In the display device HMD of this embodiment, two corners of the rectangle are step-shaped, and the light guide is symmetrical about the vertical axis. The illumination device having such a light guide as well has a symmetrical shape about the vertical axis. Further, the display panel also has a symmetrical shape about the vertical axis. By arranging two sets of a combination of a display panel and an illumination device symmetrically with respect to the vertical axis, it is possible to obtain a suitable display panel and illumination device for the display device HMD.

<Configuration Example 1>

Figure 9:
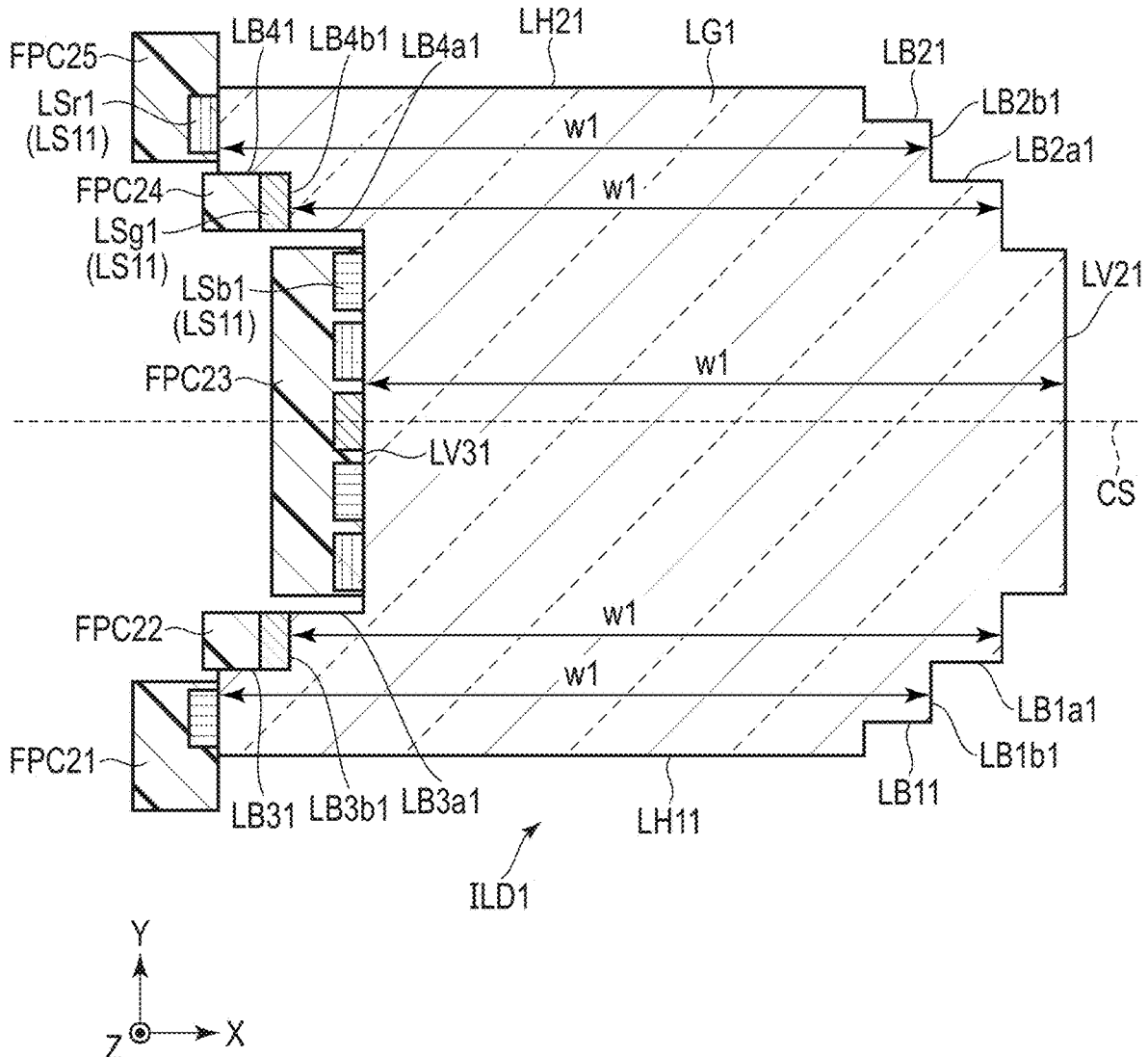
FIG. 9 is a plan view showing another example of the configuration of the illumination device used in the display device of the embodiment.

FIG. 9 is a plan view showing another configuration example of the illumination device used in the display device of the embodiment. In comparison, the configuration example shown in FIG. 9 is different from the configuration example shown in FIG. 8 in that the corners on the side where the light source elements are provided are also formed into a step-like shape.

The light guide LG1 of the illumination device ILD1 shown in FIG. 9 has an edge LB31 between the edge LH11 and the edge LV31 of the light guide LG1. The edge LB31 includes an edge LB3a1 parallel to the first direction X and an edge LB3b1 parallel to the second direction Y. The edges LB3a1 and LB3b1 are arranged alternately to form a step-shaped edge LB31 as a whole.

The light guide LG1 has an edge LB41 between the edge LH21 and the edge LV31 of light guide LG1. The edge LB41 includes an edge LB4a1 parallel to the first direction X, and an edge LB4b1 parallel to the second direction Y. The edges LB4a1 and LB4b1 are arranged alternately, and as a whole, they form a step-shaped edge LB41.

The edge LB31 is disposed to oppose the edge LB11 along the first direction X. The edge LB41 is provided to oppose the edge LB21 along the first direction X. The edge LB31 and the edge LB41 are arranged in a line-symmetric manner with respect to a virtual line CS passing through the center of the edge LV21 of the light guide LG1.

From the edge LH11 to the edge LH21, there are a plurality of edges LB3a1, a plurality of edges LB3b1, an edge LV31, a plurality of edges LB4a1, and a plurality of edges LB4b1 provided along the second direction Y. From the edge LH11 to the edge LH21, from the lower side of the sheet to the upper side, a flexible printed circuit board FPC21, a flexible printed circuit board FPC22, a flexible printed circuit board FPC23, a flexible printed circuit board FPC24, and a flexible printed circuit board FPC25 are provided.

The light source elements LS11 (light source elements LSr1, LSg1, and LSb1) disposed adjacent to each of the edges LB31 and LB41 are arranged in a step-like manner.

The flexible printed circuit boards FPC21 to FPC25, which are adjacent to the edges LB31 and LB41, are arranged in a step-like manner.

The light source element LSb1 is provided in close proximity to the edge LB3b1 that is connected to the edge LH11. The light source element LSb1 is connected to the flexible printed circuit board FPC21 provided in close proximity to the edge LB3b1.

The light source element LSg1 is provided adjacent to the light source element LSb1 along the second direction Y. The light source element LSg1 is provided in close proximity to another edge LB3b1. The light source element LSg1 is connected to the flexible printed circuit board FPC22 provided in close proximity to the edge LB3b1.

The light source element LSr1 is provided in close proximity to the edge LB4b1, which is connected to the edge LH21. The light source element LSr1 is connected to the flexible printed circuit board FPC25 provided in close proximity to the edge LB4b1.

The light source element LSg1 is provided in close proximity to the light source element LSr1 described above along a direction opposite to the second direction Y. The light source element LSg1 is provided in close proximity to another edge LB4b1. The light source element LSg1 is connected to the flexible printed circuit board FPC24 provided in close proximity to the edge LB4b1.

The light source element LSb1, light source element LSr1, light source element LSg1, light source element LSb1, and light source element LSr1 are provided in close proximity to the edge LV31. The light source element LSb1, light source element LSr1, LSg1, light source element LSb1, and light source element LSr1, which are located in close proximity to the edge LV31, are connected to the flexible printed circuit board FPC23.

It is preferable that the distance between the edge LB1b1 and the edge LB3b1, the distance between the edge LV21 and the edge LV31, and the distance between the edge LB2b1 and the edge LB4b1, along the first direction X, should be all the same as each other. The distance is defined as a length w1.

By making the distance between the edge LB1b1 and the edge LB3b1, the distance between the edge LV21 and the edge LV31, and the distance between the edge LB2b1 and the edge LB4b1 all the same length w1, it is possible to make the pattern formed on the light guide LG1 uniform.

The pattern formed on the light guide LG1 is, for example, a plurality of grooves that extend along the first direction X. Each of the plurality of grooves has a V-shaped or U-shaped cross-sectional profile. With the plurality of grooves thus provided, the light that enters from the light source element LS11 can be efficiently guided to the side opposite to the light-entering side.

FIG. 10 is a cross-sectional view schematically showing an example of the configuration of the display device in the embodiment. In comparison, the display device HMD shown in FIG. 10 differs from the display device HMD shown in FIG. 7 in that the corners on the side where the light source elements are provided are also formed into a step-like shape. FIG. 10 shows a more detailed configuration of the illumination device ILD1 shown in FIG. 9. But, in order to make the drawing easier to read, the flexible circuit board connected to the light source element is omitted in FIG. 10.

The light guide LG1 of the illumination device ILD1 shown in FIG. 10 has an edge LB51 and an edge LB61 in addition to the edges LB31 and LB41 described with reference to FIG. 9.

The edge LB51 is provided between the edge LH11 and the edge LV11 of the light guide LG1. The edge LB51 includes an edge LB5*a*1, which is parallel to the first direction X, and an edge LB5*b*1, which is parallel to the second direction Y. The edge LB5*a*1 and the edge LB5*b*1 are arranged alternately to form the step-shaped edge LB51 as a whole.

The edge LB61 is provided between the edge LH21 and the edge LV11 of the light guide LG1. The edge LB61 includes an edge LB6*a*1 parallel to the first direction X and an edge LB6*b*1 parallel to the second direction Y. The edge LB6*a*1 and the edge LB6*b*1 are arranged alternately to form the step-shaped edge LB61 as a whole.

The light source elements LS11 (light source elements LSr1, LSg1, and LSb1) disposed adjacent to each of the edges LB31 and LB41 are arranged in a step-like pattern.

The light guide LG2 of the illumination device ILD2 shown in FIG. 10 has an edge LB32, an edge LB42, an edge LB52, and an edge LB62 as in the case of the light guide LG1.

The edge LB32 is provided between the edge LH12 and the edge LV32 of the light guide LG2. The edge LB32 includes an edge LB3*a*2 parallel to the first direction X and an edge LB3*b*2 parallel to the second direction Y. The edges LB3*a*2 and LB3*b*2 are arranged alternately to form the step-shaped edge LB32 as a whole.

The edge LB42 is provided between the edge LH22 and the edge LV32 of the light guide LG2. The edge LB42 includes an edge LB4*a*2 parallel to the first direction X and an edge LB4*b*2 parallel to the second direction Y. The edges LB4*a*2 and LB4*b*2 are arranged alternately to form the step-shaped edge LB42 as a whole.

The edge LB52 is provided between the edge LH12 and the edge LV12 of the light guide LG2. The edge LB52 includes an edge LB5*a*2 parallel to the first direction X, and an edge LB5*b*2 parallel to the second direction Y. The edges LB5*a*2 and LB5*b*2 are arranged alternately to form the step-shaped edge LB52 as a whole.

The edge LB62 is provided between the edge LH22 and the edge LV12 of the light guide LG2. The edge LB62 includes an edge LB6*a*2 parallel to the first direction X and an edge LB6*b*2 parallel to the second direction Y. The edges LB6*a*2 and LB6*b*2 are arranged alternately, and as a whole, they form the step-shaped edge LB62.

The light source elements LS12 (light source elements LSr2, LSg2, and LSb2) disposed adjacent to each of the edges LB32 and LB42 are arranged in a step-like manner.

The distance between the edge LB1*b*1 and the edge LB3*b*1, the distance between the edge LV21 and the edge LV31, the distance between the edge LB2*b*1 and the edge LB4*b*1, the distance between the edge LB1*b*2 and the edge LB3*b*2, the distance between the edge LV22 and the edge LV32, and the distance between the edge LB2*b*2 and the edge LB4*b*2, should preferably be all the same as each other.

Note that it is also possible to omit the edges LB51, LB61, LB52, and LB62, and simply provide only the edges LV11 and LV12, which run along the second direction Y. In other words, in the light guide LG1 and the light guide LG2, the outermost edges on the side where the light source elements are provided may not have a step-shaped configuration, but can be simply straight edges.

The display panel PNL2 and the illumination device ILD2 are the ones that are arranged by rotating the display panel PNL1 and the illumination device ILD1 by 180°. Or it can be said that the display panel PNL2 and the illumination device ILD2 are the ones that are arranged horizontally symmetrical as compared to the display panel PNL1 and the illumination device ILD1. In this way, a set of display panels and illumination devices can be used as a different combination of display panels and illumination devices. Therefore, there is no need to manufacture the display panels and illumination devices for the right eye and left eye separately, and the manufacturing costs can be reduced.

In this disclosure, the edges LH11 and the edges LH12 shown in FIGS. 7 and 8 are referred to as the first edges and the second edges, respectively. The edges LV21 and the edges LV31 are referred to as the third edges and fourth edges, respectively. The edges LB11 and the edges LB21 are referred to as the fifth edges and the sixth edges, respectively.

The edges LB1*a*1 and LB1*b*1 of the edge LB11 are referred to as the first short edge and the second short edge, respectively. The edges LB2*a*1 and the edge LB2*b*1 of the edge LB21 are referred to as the third short edge and the fourth short edge, respectively.

The edges LB31 and the edges LB41 shown in FIGS. 9 and 10 are referred to as the seventh edges and the eighth edges, respectively. The edge LB3*a*1 and the edge LB3*b*1 of the edge LB31 are referred to as the fifth edge and the sixth short edge, respectively. The edge LB4*a*1 and the edge LB4*b*1 of the edge LB41 are referred to as the seventh short edge and the eighth short edge, respectively.

The portion RV11, the portion RB11, and the portion RB21 of the reflector plate REF11 shown in FIGS. 7 and 10 may as well be referred to as the first portion, the second portion, and the third portion, respectively. The portion RB1*a*1 and the portion RB1*b*1 may as well be referred to as the first segment and the second segment, respectively. The portion RB2*a*1 and the portion RB2*b*1 may as well be referred to as the third segment and the fourth segment, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
   a light guide including a first edge and a second edge extending in a first direction, a third edge and a fourth edge extending in a second direction intersecting the first direction, a fifth edge provided between the first edge and the third edge, a sixth edge provided between the second edge and the third edge;
   a plurality of light source elements provided in close proximity to the fourth edge; and
   a reflector comprising a first portion parallel to the third edge, a second portion having a step-like shape, and a third portion having a step-like shape,
   wherein
   the fifth edge includes a first short edge extending in the first direction and a second short edge extending in the second direction, which are arranged alternately,
   the sixth edge includes a third short edge extending in the first direction and a fourth short edge extending in the second direction, which are arranged alternately, the second portion includes a first segment extending in the first direction and a second segment extending in the second direction, which are arranged alternately, and the third portion includes a third segment extending in the first direction and a fourth segment extending in the second direction, which are arranged alternately.

2. The illumination device according to claim 1, wherein the plurality of light source elements are disposed adjacent to the fourth edge.

3. The illumination device according to claim 1, wherein the light guide further comprises a seventh edge provided between the fourth edge and the third edge, and an eighth edge provided between the fourth edge and the third edge, the seventh edge includes a fifth short edge extending in the first direction and a sixth short edge extending in the second direction, which are arranged alternately, and the eighth edge includes a seventh short edge extending in the first direction and an eighth short edge extending in the second direction, which are arranged alternately.

4. The illumination device according to claim 3, wherein the plurality of light source elements are disposed adjacent to the sixth short edge, the fourth edge, and the eighth short edge.

5. The illumination device according to claim 3, wherein the plurality of light source elements are each a laser light source that emits laser light.

6. The illumination device according to claim 1, wherein the first segment and the second segment oppose the first short edge and the second short edge, respectively, and the third segment and the fourth segment oppose the third short edge and the fourth short edge, respectively.

7. A display device comprises a display panel and an illumination device, the illumination device comprising:

a light guide including a first edge and a second edge extending in a first direction, a third edge and a fourth edge extending in a second direction intersecting the first direction, a fifth edge provided between the first edge and the third edge, a sixth edge provided between the second edge and the third edge;

a plurality of light source elements provided in close proximity to the fourth edge; and a reflector comprising a first portion parallel to the third edge, a second portion having a step-like shape, and a third portion having a step-like shape, wherein the fifth edge including a first short edge extending in the first direction and a second short edge extending in the second direction, which are arranged alternately, the sixth edge including a third short edge extending in the first direction and a fourth short edge extending in the second direction, which are arranged alternately, the second portion includes a first segment extending in the first direction and a second segment extending in the second direction, which are arranged alternately, and the third portion includes a third segment extending in the first direction and a fourth segment extending in the second direction, which are arranged alternately.

8. The display device according to claim 7, wherein the plurality of light source elements are disposed adjacent to the fourth edge.

9. The display device according to claim 7, wherein the light guide further comprises a seventh edge provided between the fourth edge and the third edge, and an eighth edge provided between the fourth edge and the third edge, the seventh edge includes a fifth short edge extending in the first direction and a sixth short edge extending in the second direction, which are arranged alternately, and the eighth edge includes a seventh short edge extending in the first direction and an eighth short edge extending in the second direction, which are arranged alternately.

10. The display device according to claim 9, wherein the plurality of light source elements are disposed adjacent to the sixth short edge, the fourth edge, and the eighth short edge.

11. The display device according to claim 7, wherein the plurality of light source elements are each a laser light source that emits laser light.

12. The display device according to claim 7, wherein the first segment and the second segment oppose the first short edge and the second short edge, respectively, and the third segment and the fourth segment oppose the third short edge and the fourth short edge, respectively.

13. The display device according to claim 7, wherein the display panel is a polygonal display panel.

* * * * *